April 2, 1963     R. G. ELLIS     3,083,816
ARTICLE CONVEYING MECHANISM
Filed May 5, 1960     3 Sheets-Sheet 1

INVENTOR.
Rollo G. Ellis.
BY
Harness, Dickey & Pierce
ATTORNEYS.

April 2, 1963  R. G. ELLIS  3,083,816
ARTICLE CONVEYING MECHANISM
Filed May 5, 1960  3 Sheets-Sheet 3
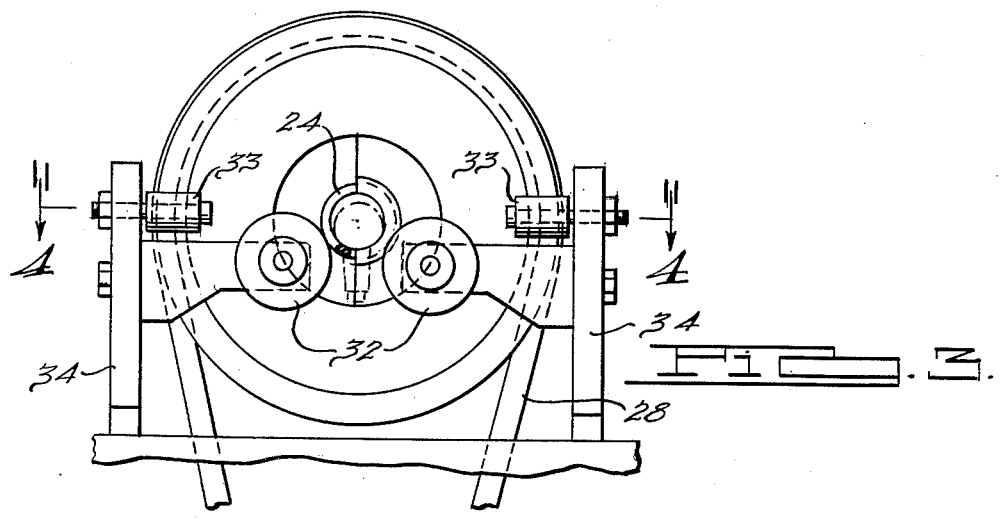
FIG. 3.
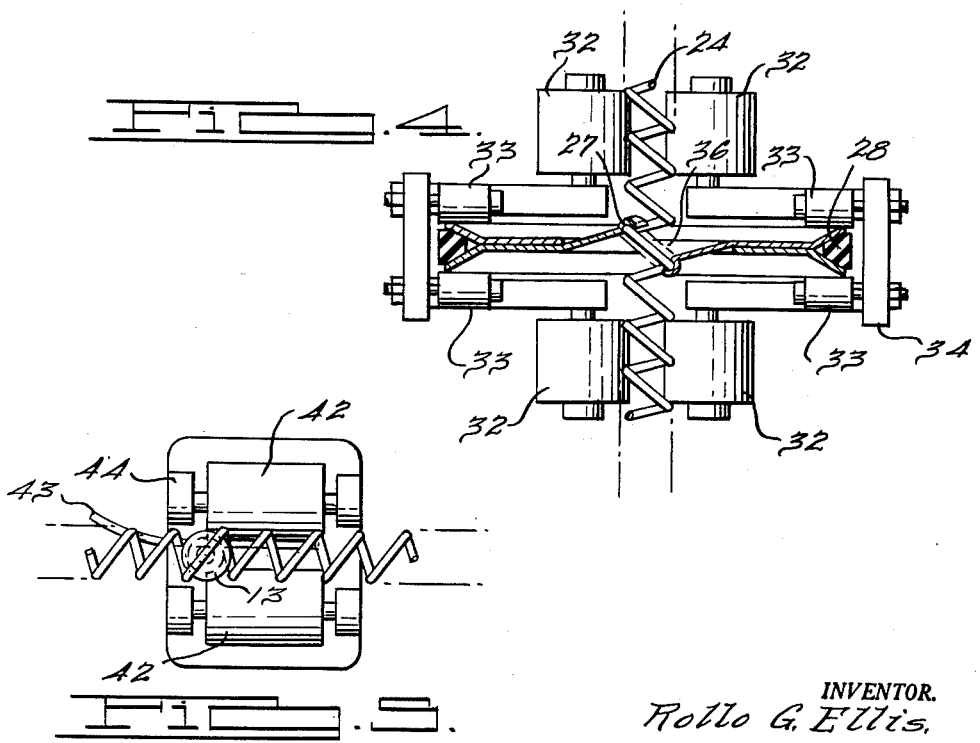
FIG. 4.
FIG. 5.
INVENTOR.
Rollo G. Ellis,
BY
Harness, Dickey & Pierce
ATTORNEYS.

United States Patent Office 3,083,816
Patented Apr. 2, 1963

3,083,816
ARTICLE CONVEYING MECHANISM
Rollo G. Ellis, Birmingham, Mich., assignor to Micromatic Hone Corporation, Detroit, Mich., a corporation of Michigan
Filed May 5, 1960, Ser. No. 27,199
9 Claims. (Cl. 198—213)

This invention relates to article conveying means and methods, and particularly to a conveyor for, and the method of, advancing articles from one station to another.

There are various means employed today for conveying elements from one station to another so that operations may be performed thereon seriatim in different machines. Such conveyor equipment was usually costly, bulky and required considerable area in which to operate.

The conveyor of the present invention is unique in that it is flexible and can be readily set up between machines for transporting an element on a straight line in an elevated or deflected path, in a wide arcuate path or at right angles when a second conveyor element is utilized below the first conveyor element.

The conveyor embodies a helical spring-like conveyor element having the turns spaced apart a predetermined distance to permit a stud, arm or other projecting portion of the article to be transported to extend therebetween, so that the articles are spaced apart and advanced at a uniform speed. The spacing of the articles by the turns prevents the finished surface of one finished article from engaging that of another. The rod or wire from which the conveyor is made has a smooth surface, and since it is only the weight of the article which bears thereagainst, there is no scratching or marring of the surface due to the advancement along the turns of the conveyor element.

The article, such as a ball and stud element which is herein illustrated by way of example, is delivered by a trough, belt or other device to the end of the conveyor element from a machine which has performed an operation thereon. The ball and stud element is so advanced as to have the stud extend downwardly with the ball in position to be picked up by the end turn of the conveyor which deposits it within the cylindrical turns with the stud extending downwardly therebetween. The conveyor element is run at a speed to have the balls spaced a turn or two apart so that they cannot contact each other as they are advanced at a constant speed along the helical turns of the conveyor element.

The conveyor element rests upon rollers at different points throughout the length thereof, so spaced as to prevent the turns of the conveyor element from passing downwardly therethrough while permitting the stud to pass therebetween. The conveyor element can be rotated with a sleeve having a slot in the bottom of a width to permit the stud to pass therethrough while the ball portion is passing through the conveyor element.

Accordingly, the main objects of the invention are: to provide a conveyor element driven in rotation and formed to have a helical lead which advances articles from one end thereof to the other; to construct a conveyor from a helical formed rod of predetermined lead and diameter conforming to the article to be advanced along a straight path which may be directed upwardly, downwardly and arcuately at different points throughout the length thereof; to form a conveyor from a helical wound rod of predetermined angle and diameter with the turns spaced apart sufficiently to receive a projecting portion of the article at a speed to space the articles a predetermined distance apart out of engagement with each other, and, in general, to provide a conveyor for articles which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIG. 3 is an enlarged broken sectional view of the structure illustrated in FIG. 2, taken on the line 3—3 thereof;

FIG. 4 is a sectional view of the structure illustrated in FIG. 3, taken on the line 4—4 thereof, and FIG. 5 is the structure illustrated in FIG. 2, as viewed from the point 5 thereof.

Figure 1:
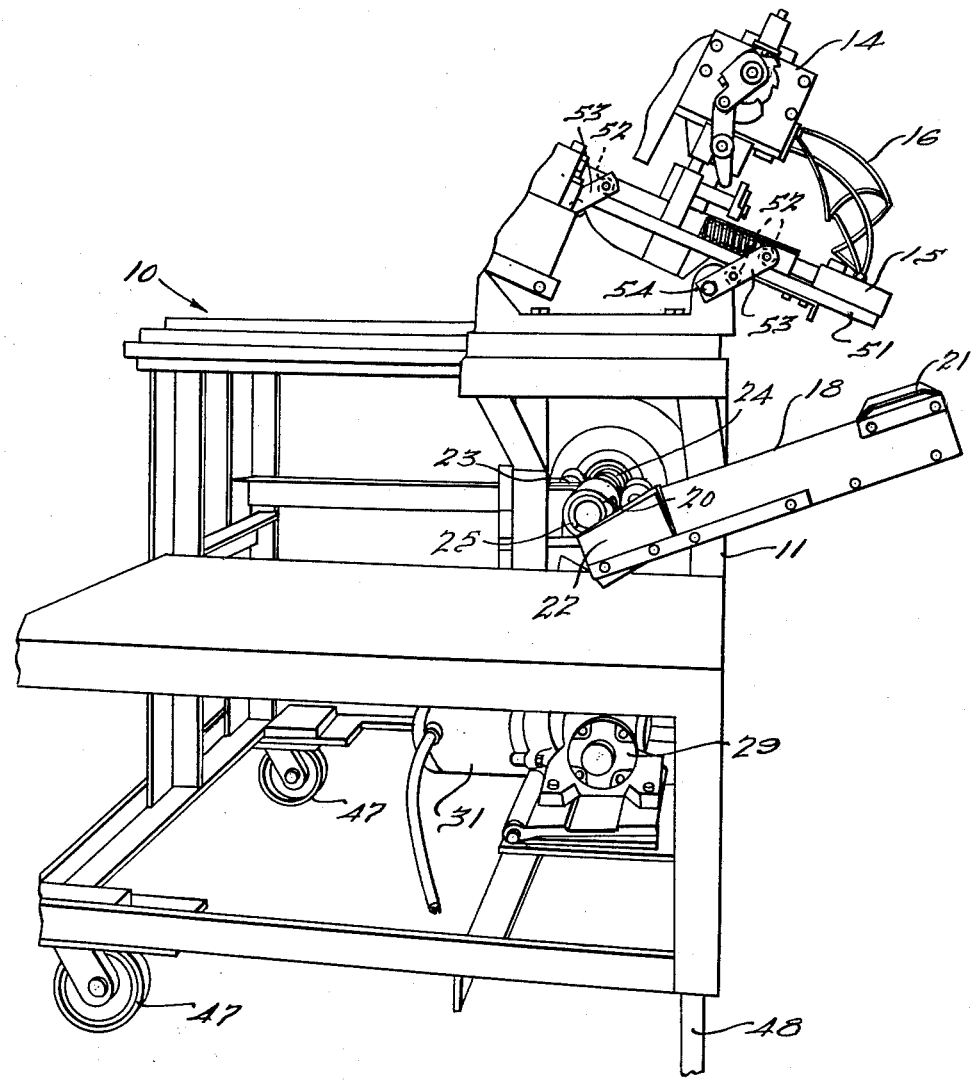
FIGURE 1 is a broken view in side elevation of a machine having a conveyor of the present invention attached thereto.

A machine 10, to which the conveyor of the present invention is applied, has a frame 11 carrying a head 12 to which ball and socket elements 13 are delivered from a hopper (not illustrated) to a head 14 from which they are delivered seriatim to a head 15 through a wire chute 16. The ball and socket elements are directed into a pair of arcuate recesses in spring-pressed jaws 17 in the head 15 from which they are ejected and dropped into a trough 18. The trough 18 has two side plates 19 to which sloping flanged elements 21 are secured between which the ball can roll to have the stud portion thereof extend downwardly between the plates. The trough 18 slopes downwardly at a sufficient angle to cause the ball and stud elements to slide downwardly thereon and to be directed by a pair of spaced plates 22 into a receiving sleeve 23 which is mounted upon the frame 11.

Figure 2:
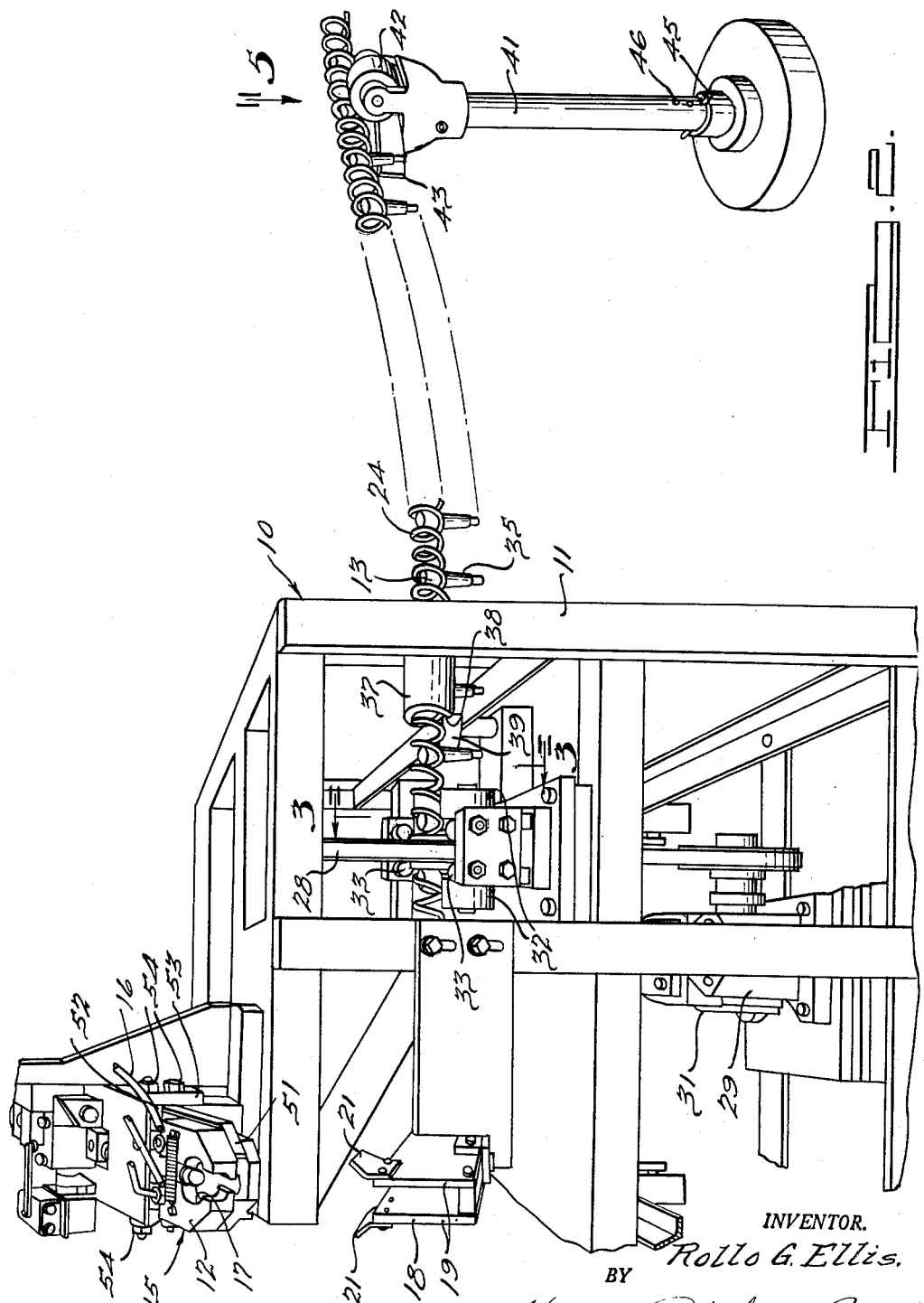
FIG. 2 is a front view of the structure illustrated in FIG. 1.

The sleeve 23 has a side opening 20 adjacent to the lower end of the plates 22 for receiving a ball and socket element and supporting the adjacent end 25 of the conveyor element. The conveyor element 24 is made from a heavy wire or rod which is coiled into an open spring with the turns sufficiently spaced to permit the stud to drop therethrough when the ball is advanced within the conveyor. The turns are sufficiently close together to prevent the ball on the end of the stud from dropping therethrough. The end 25 of the conveyor element will pick up a ball and advance it through the center of the turns to the right as illustrated in FIG. 2, since the conveyor element is wound as a left-hand thread.

A pulley 26 is fixed to the outer surface of a turn of the conveyor element, the wall adjacent to the omitted hub being slotted and deflected to form a helical surface with the inner edge 27 following the lead of the turn of the conveyor element to which it is welded or otherwise secured. The pulley is driven in the conventional manner by a belt 28 from a speed reducing element 29 and motor 31. The pulley is supported by the conveyor element which rests upon four rollers 32, two of which are ahead of the pulley in the direction from which the work is received and the other two being behind the pulley. A space is provided between the rollers 32 for the stud portion 35 of the ball and socket element to pass therebetween. To prevent the pulley and conveyor element from moving along the axis of the latter, two sets of rolls 33 are mounted at diametrical points on the peripheral edge thereof. The rollers 33 are supported on a frame 34 which is attached to the frame 11 of the machine. The shape of the central helical portion of the pulley 26 and opening 36 therethrough permits the stud portion 35 of the ball and stud element to pass therethrough as the ball is advanced by the lead of the turns of the conveyor element. Thus, the conveyor element 24 rests upon the rollers 32 and is maintained from shifting endwise by the rollers 33 which engage the opposite sides of the peripheral edge of the pulley at diametrically opposite points.

The conveyor element extends through a second sleeve 37 secured to the frame 11, having a slot 38 in the bottom to permit the stud portion to pass therethrough after being directed thereinto by a guide plate 39 toward which the stud portions are carried. The conveyor is supported at a number of points by portable stands 41, each having a pair of rollers 42 supported at the top thereof, spaced apart a sufficient distance to permit the stud portions 35 to pass therebetween. A guide plate 43 is secured to a boss 44 which supports the shaft of the rollers 42 and against which the stud portions are carried during their advancement due to the clockwise rotation of the conveyor. The plate 43 guides the stud portions 35 into the space between the rollers 42 as they are advanced by the conveyor element. The number of portable stands 41 to be employed depends upon the length as well as strength of the conveyor elements to prevent it from sagging any appreciable amount when loaded. A removable pin 45 may be inserted through any one of a number of apertures 46 in the column of the stand to control the height of the rollers 42 supported thereby.

The stands may increase in height when the conveyor is to carry the articles to a higher level or may be progressively shorter if the articles are to be lowered. The stands may be set on an arc to direct the articles either to the right or to the left of a straight path, and when the path changes at an abrupt angle to deliver the elements a substantial distance to the right or left of the path of the first conveyor element, a second conveyor element is employed disposed below the first conveyor element. A pick-up head is utilized similar to the sleeve 23 to which the ball and stud element 13 is delivered by the first conveyor element 24 so that it will be picked up and directed at any desired angle by the second conveyor element 24.

The frame 11 is provided with a pair of casters 47 on one side and supporting legs 48 on the other to permit the frame to be readily moved to any desired position, making the conveyor extremely portable. The conveyor may be shifted to any point of a machine for picking up the articles to be conveyed and for directing them to any other machine, bench, storage place or the like by the use of the single conveying element 24 or by employing a plurality thereof, as pointed out hereinabove. Thus, the articles may be delivered from the conveyor element and frame 11 to a higher or lower level, or to the right or the left of the conveyor at any angle thereto. If the angle is not too abrupt, the supporting stands may be disposed on an arc which will be maintained by the conveyor element 24, but if the angle is too abrupt, a second conveyor element is utilized in the manner as pointed out hereinabove.

As pointed out above, a troughlike element may receive the articles to be conveyed, or the end of a spiral conveyor element 24 may direct the articles to the second conveyor of the same or similar type. A ball, a cubical or a rectangular element with or without an appendange thereon which will fit within the inner diameter of the element 24 and the space between the turns thereof, can be conveyed thereby. A ball can be carried through the conveyor in perfect spherical form or with a stud or other protuberance extending therefrom. Once the ball or article is picked up by the conveyor it is maintained spaced from a leading or following ball and stud or other element to thereby protect one from the other so that no damage can occur to the surface thereof. It is to be understood that the rod or wire employed to form the conveying element 24 may be highly polished or plated with nickel-chrome or the like to provide a highly polished finished surface which could not mar or scratch the surface of the element which is being conveyed. The rod could be made of soft material, such as soft steel, copper and the like, so that the material itself could not scratch or mar the surface of the ball.

The conveyor is simple, positive and versatile for advancing articles to a point remote from the point at which they are delivered to any point above, below or to the right or left of the station at which the article was received.

The ball and socket element 13 is ejected from the jaws 17 upon the rearward movement of the head 15. The head has a plate 51 extending outwardly at each side of the jaw and supported between four pairs of rollers 52, two pairs engaging the top and bottom of the plate at each side edge thereof. The spaced rollers 52 are mounted on the ends of links 53 which are attached to the sides of the machine on screws 54 on which the links are angularly adjusted. The engagement of the four pairs of rollers at the top and bottom of the plate 51 permits it to be retracted with little resistance and eliminates the costly ways which would otherwise be required.

What is claimed is:

1. In a conveyor for a ball-like article having an appendage, a helical element of substantial length, means for supporting said helical element for rotation, a stationary sleeve for receiving an article to be conveyed containing one end of the helical element which rotates therein, means for driving said element in rotation, and mounting means for said element constructed to permit an article to be received at one end and delivered from the other end thereof, the helical element being a rod coiled as a spring with the turns spaced apart sufficiently to receive an appendage on the article being advanced which extends downwardly therebetween, said sleeve having an opening in the side of the receiving end through which the article passes and a slot along the length of the bottom through which the appendage is advanced.

2. In a conveyor for a ball-like element having an appendage, a helical element of substantial length, means for supporting said helical element for rotation, a sleeve for receiving an article to be conveyed rotatably confining one end of the helical element, means for driving said element in rotation, mounting means for said element constructed to permit an article to be received at one end and delivered from the other end thereof, the helical element being a rod coiled as a spring with the turns spaced apart sufficiently to receive an appendage on the article therewithin which extends downwardly therebetween, and a pulley having a helical opening in the center secured to a turn of the element with a slot extending outwardly thereof in extension of the space between said turn.

3. In a conveyor, a helical element of substantial length, means for supporting and driving said helical element in rotation, a sleeve for receiving an article to be conveyed containing one end of the helical element, means for driving said element in rotation, mounting means for said element constructed to permit an article to be received at one end and delivered from the other end thereof, the helical element being a rod coiled as a spring with the turns spaced apart sufficiently to receive an appendage on the article therewithin which extends downwardly therebetween, a pulley having a helical opening in the center secured to a turn of the element with a slot extending outwardly thereof in extension of the space between said turn, and sets of rollers engaging the sides of the pulley for preventing the conveyor element from advancing axially.

4. In a conveyor, a coiled rod of wire forming a helical element of substantial length and spaced apart turns, means for supporting said helical element for rotation, means for driving said element in rotation, mounting means for said element constructed to permit an article to be received at one end and delivered from the other end thereof, a pulley having a helical opening in the center secured to a turn of the element with a slot extending outwardly thereof in extension of the space between said turn, sets of rollers engaging the sides of the pulley for preventing the conveyor element from advancing axially, a support for the remote end of the conveyor having a pair of rollers thereon in spaced relation.

5. In a conveyor, a helical element of substantial length, means for supporting and driving said helical element in rotation, a sleeve for receiving an article to be conveyed containing one end of the helical element, means for driving said element in rotation, mounting means for said element constructed to permit an article to be received at one end and delivered from the other end thereof, the helical element being a rod coiled as a spring with the turns spaced apart sufficiently to receive an appendage on the article which extends downwardly therebetween, said sleeve having an opening in the side of the receiving end and a slot along the length of the bottom, the supporting means for said helical conveyor embodying rollers spaced apart a distance to permit an appendage on the article to pass therebetween and close enough to support the conveyor element, a pulley having a helical opening in the center secured to a turn of the element, sets of rollers engaging the sides of the pulley for preventing the conveyor element from advancing axially, a support for the remote end of the conveyor having a pair of rollers thereon in spaced relation, a guide on the forward end of the support against which the protuberances on the articles are carried to guide them in the space between the rollers.

6. In a conveyor for carrying articles within the interior thereof, a helical conveyor element made from wire or a rod having open turns for carrying an article therethrough when rotated in a manner to advance the article therewithin along the axis of the conveyor, rollers on which said conveyor element rests and on which it is rotated, a pulley having an elongated slot through the center with opposite sides deflected in opposite directions to provide a passageway at an angle to the plane of the pulley and with the edges of the slot at the cenetr secured to a turn of the conveyor element, and a belt for rotating said pulley.

7. In a conveyor for carrying articles within the interior thereof, a helical conveyor element made from wire or a rod having open turns for carrying an article therethrough when rotated in a manner to advance the article therewithin along the axis of the conveyor, rollers on which said conveyor element rests and on which it is rotated, a pulley having an elongated slot through the center with opposite sides deflected in opposite directions to provide a passageway at an angle to the plane of the pulley and with the edges of the slot at the center secured to a turn of the conveyor element, a belt for rotating said pulley, and rollers engaging at least one side of said pulley for preventing the conveyor element from moving lengthwise.

8. In a conveyor for carrying articles within the interior thereof, a helical conveyor element made from wire or a rod having open turns for carrying an article therethrough when rotated in a manner to advance the article therewithin along the axis of the conveyor, rollers on which said conveyor element rests and on which it is rotated, a pulley having an elongated slot through the center with opposite sides deflected in opposite directions to provide a passageway at an angle to the plane of the pulley and with the edges of the slot at the center secured to a turn of the conveyor element, a belt for rotating said pulley, rollers engaging at least one side of said pulley for preventing the conveyor element from moving lengthwise, and a sleeve at the receiving end of the conveying element having a recess therein into which the article is delivered to be picked up by the helical turn at the end of the conveyor element during the rotation thereof in a direction toward the article, the article being carried within the conveyor element and advanced therealong by the spaced helical turns thereof.

9. In a conveyor for carrying articles within the interior thereof, a helical conveyor element made from wire or a rod having open turns for carrying an article therethrough when rotated in a manner to advance the article therewithin along the axis of the conveyor, rollers on which said conveyor element rests and on which it is rotated, a pulley having an elongated slot through the center with opposite sides deflected in opposite directions to provide a passageway at an angle to the plane of the pulley and with the edges of the slot at the center secured to a turn of the conveyor element, a belt for rotating said pulley, rollers engaging at least one side of said pulley for preventing the conveyor element from moving lengthwise, and a sleeve at the receiving end of the conveying element having a recess therein into which the article is delivered to be picked up by the helical turn at the end of the conveyor element during the rotation thereof in a direction toward the article, the article being carried within the conveyor element and advanced therealong by the spaced helical turns thereof, said turns being spaced sufficiently to have a projecting portion on the article extend downwardly therebetween and said support being such as to permit the projecting portion to move along the conveyor element from one to the other end thereof.

References Cited in the file of this patent

UNITED STATES PATENTS

| 1,741,981 | Dewey et al. | Dec. 31, 1921 |
| 2,325,896 | Waller | Aug. 3, 1943 |
| 2,558,753 | Holstein | July 3, 1951 |
| 2,620,917 | Dahlberg | Dec. 9, 1952 |
| 2,622,939 | Ljunggren | Dec. 23, 1952 |

FOREIGN PATENTS

| 14,085 | Great Britain | 1909 |
| 608,568 | Great Britain | Sept. 16, 1948 |